Figure 1:
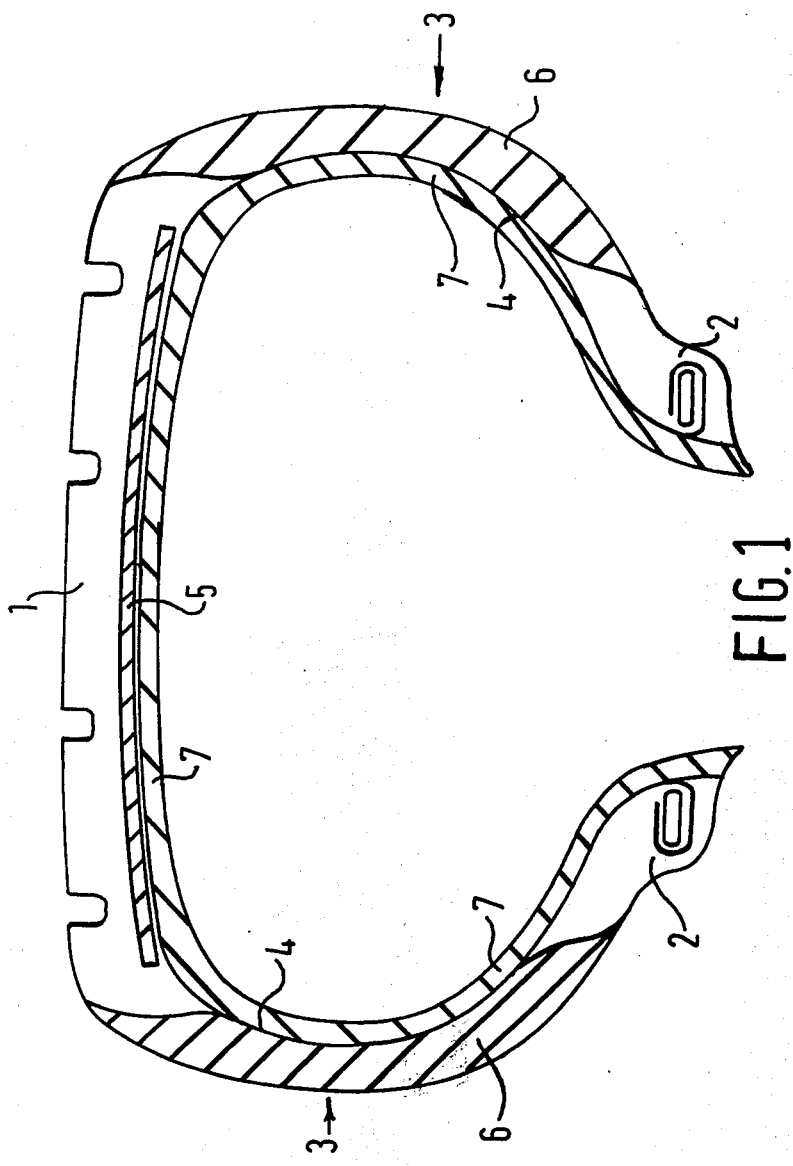

United States Patent [19]
Harrington

[11] 3,964,532
[45] June 22, 1976

[54] PNEUMATIC TIRES
[75] Inventor: Wilfred Henry Harrington, West Midlands, England
[73] Assignee: Dunlop Limited, London, England
[22] Filed: Oct. 29, 1974
[21] Appl. No.: 518,998

[30] Foreign Application Priority Data
Nov. 7, 1973   United Kingdom............ 51754/73

[52] U.S. Cl. ........................................ 152/330 RF
[51] Int. Cl.² ....................................... B60C 17/00
[58] Field of Search.......... 152/330 RF, 352, 353 R, 152/353 C, 354, 355, 356, 360, 330 L, 330 C

[56] References Cited
UNITED STATES PATENTS
3,625,271   12/1971   Hutch ................................. 152/354
3,814,161   6/1974   Powell ................................ 152/352
3,841,375   10/1974   Edwards........................ 152/353 R

*Primary Examiner*—Allen N. Knowles
*Assistant Examiner*—Hadd Lane
*Attorney, Agent, or Firm*—Stevens, Davis, Miller & Mosher

[57] ABSTRACT

A pneumatic tire having a tread portion with substantially flat ground-contacting surface, beads and sidewalls; the tread being braced by a breaker assembly. The tread of the tire has a width at least 20% greater than the distance between the bead heels of the inflated tire on its rim. The sidewalls each have a thickness at their thinnest part which is at least 5% of the overall width of the tire and the tire contains a carcass reinforcement consisting of a single ply of substantially radially extending textile cords.

8 Claims, 2 Drawing Figures

PNEUMATIC TIRES

This invention relates to pneumtic tires.

According to the invention a pneumatic tire comprises a tread portion having a substantially flat ground-contacting surface, beads and sidewalls, the tread portion being braced by a breaker assembly and having a width, when the tire is in use and inflated, less than the overall tire section width but at least 20% wider than the distance between the heels of the beads, the sidewalls each having a thickness at their thinnest part of at least 5% of the overall tire section width wherein the tire contains a carcass reinforcement consisting of a single ply of substantially radially extending textile cords.

It is conventional for radial ply car tires, with steel or textile breakers, to have a carcass which comprises two plies of textile cords having equal and opposite bias angles between 80° and 90° to the mid-circumferential plane of the tire. On the other hand radial ply truck and earthmover tires are constructed on far more substantial lines and using steel cords in the carcass so that to remain flexible the carcass consists of one only radial ply of steel cords.

The tire of the present invention is a safety tire designed so that when used with a lubricated interior on a wheel rim with provision to prevent the beads falling into a well the tire will behave satisfactorily and controllably, at least for a limited time, without inflation air. The tire preferably has a low aspect ratio e.g. 50 to 75% and sidewalls of short length to improve its handling in the deflated mode.

The tread portion of the tire may be braced by any suitable breaker but particularly suitable is a breaker comprising two folded plies of steel or textile, the folds being at opposite edges of the breaker. Preferably the tread portion is at least 35% wider than the distance between bead heels when the tire is in use (inflated) on its rim.

The sidewalls of the tire, it will be appreciated, are thicker than is conventional in radial ply tires in order to prevent sharp folds occurring in the sidewalls when the tire is flat. Preferably the sidewalls include rubber compound(s) of high resilience, for example, greater than 85% as measured by the Dunlop Pendulum method at 50°C both inside and outside the carcass reinforcement ply, in order to reduce heat generation by sidewall flexing when the tire is running in the deflated mode. More preferably the resilience is at least 87% as described in U.S. patent application Ser. No. 279,239, filed Aug. 9, 1972, now U.S. Pat. No. 3,841,375, Oct. 15, 1974.

The beads of the tire also preferably comprise high resilience rubber compound(s) although, owing to the high hardness of the compounds generally needed in the bead e.g. above 70 Shore A the resilience cannot be as high as in the sidewalls. A tire with high resilience compounds in the bead i.e. compounds whose resilience is greater than 60% when measured by the Dunlop Pendulum method at 50°C (BS 903 Part A8 Method C) is described in U.S. Pat. application Ser. No. 413,603, filed Nov. 7, 1973, now Pat. No. 3,921,690 of Nov. 25, 1975. Preferably the bead reinforcing coil is a strip-type coil.

Preferably the single carcass reinforcement ply is made from cords of a textile material having high tenacity, good flex resistance, high modulus and which is insensitive to temperature in order to best withstand the conditions arising out of running of the tire in the deflated mode. Thus preferably the carcass is made from the recently developed aromatic polyamide tire fibre which has a high tenacity (132 gm/tex) and high modulus (3100 gm/tex) although a cheaper fibre e.g. rayon may be utilized where lower performance is acceptable.

The position of the single carcass ply within the sidewalls of the tire may be varied, owing to the relatively high thickness of the sidewalls, to vary the flex characteristics of the sidewalls.

Figure 2:
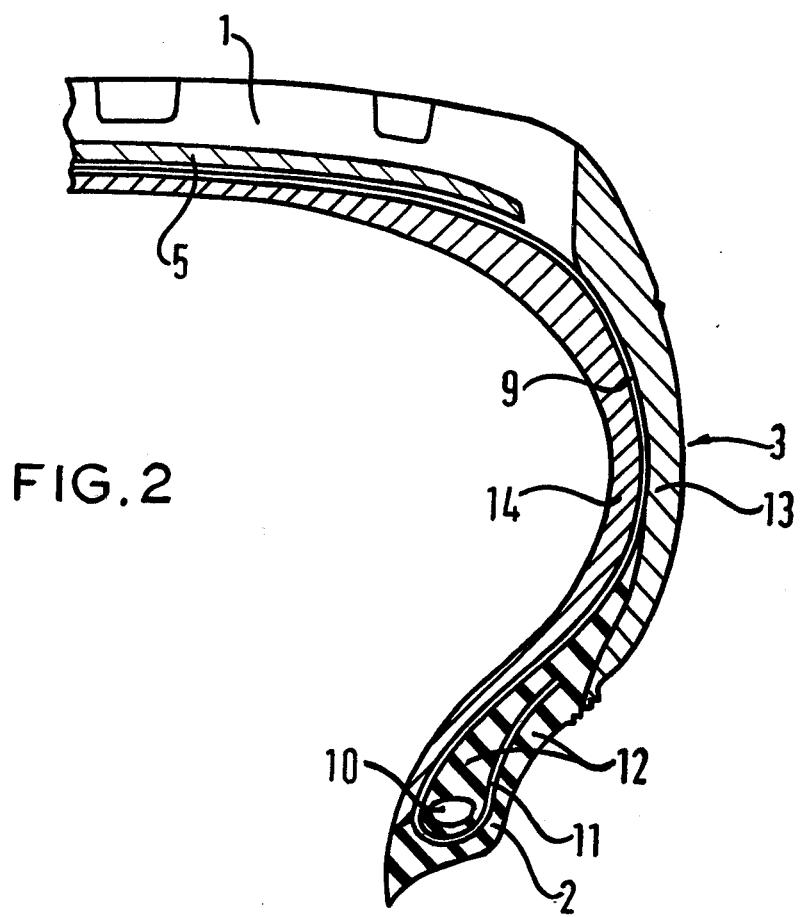

The invention will now be particularly described by way of example only with reference to the accompanying drawings in which FIGS. 1 and 2 are diagrammatic cross-sectional views of tires in accordance with the invention.

The tire shown in FIG. 1 consists of a tread portion 1, beads 2 and sidewalls 3, the tread portion 1 being approximately 50% wider than the distance between the heels 2a of the beads 2, the aspect ratio of the tire being about 65%.

The beads 2 are reinforced by strip-type bead coils and a carcass reinforcing ply 4 of radial cords of aromatic polyamide fibre (Fibre B) extends from bead to bead, wrapping around the bead coils, the ply endings being trapped against the respective bead coils by hard rubber apex strips in each bead.

A breaker assembly 5 is located between the carcass ply and the ground contacting surface of the tread portion of the tire to brace the tread of the tire.

The sidewalls 3 include high resilience sidewall rubbers 6, which are of a rubber compound having a resilience of 90% (Dunlop Pendulum method at 50°C) and a hardness of about 55 Shore A, and an inner liner 7 which is also of a high resilience rubber compound of resilience 87% (Dunlop Pendulum 50°C) and hardness 55 Shore A.

The minimum sidewall thickness is approximately 7% of the total section width of the tire.

The tire of which one sidewall and half the tread is shown in FIG. 2 is a preferred construction again comprising tread 1, beads 2 and sidewalls 3 the tread being braced by a breaker assembly 5.

In this case, however, the monoply carcass 9 comprising cords of fibre B is turned around a wire bead coil 10 to form a ply turn up 11 which is embedded in a rubber compound 12 of hardness 80° BS and a high resilience e.g. 66% at 50°C measured by the Dunlop Pendulum. (This resilience is high bearing in mind the high hardness, it being more difficult to obtain high resilience as hardness is increased). The sidewall rubber 13 and inner liner 14 each consist of a high resilience compound e.g. 90% at 50°C hardness 52° BS, and their relative thicknesses are arranged so that at least 30% of the sidewall thickness at the point of maximum width of the tire is rubber on the interior of the carcass as described in co-pending U.S. patent application Ser. No. 515,245 filed Oct. 16, 1974. It will be noted also that both the overall sidewall thickness and the thickness of rubber inside the carcass increase up to the tire shoulder region so that throughout the upper sidewall the carcass ply 9 remains adjacent the mid-thickness of the sidewall.

The minimum sidewall thickness is approximately 6% of the total section width of the tire.

Having now described my invention what I claim is:

1. A pneumatic tire having an aspect ratio in the range 50 – 75% and comprising a tread portion having a substantially flat ground contacting surface, beads and sidewalls, said sidewalls including rubber compounds of resilience greater than 85% measured by the Dunlop Pendulum Test at 50°C, the beads of the tire comprise rubber compound having a hardness greater than 70 Shore A and a resilience of greater than 60% as measured by the Dunlop Pendulum Test at 50°C, the tread portion being braced by a breaker assembly and having a width, when the tire is in use and inflated, less than the overall tire section width, the overall tire section width being a maximum in the mid-sidewall region of the tire, but at least 20% wider than the distance between the heels of the beads, the sidewalls each having a thickness at their thinnest part of at least 5% of the overall tire section width, the tire containing a carcass reinforcement consisting of a single layer ply of substantially radially extending textile cords extending from one tire bead to the other, and the carcass is made of cords comprising a heat resistant textile selected from the class consisting of rayon and aromatic polyamide fibers.

2. A pneumatic tire according to claim 1, in which the width of the tread of the tire is at least 35% greater than the distance between bead heels when the tire is inflated.

3. A pneumatic tire according to claim 2 in which the overall sidewall thickness and the thickness of the rubber inside the tire carcass increase from the widest part of the tire towards the tyre shoulder so that throughout the upper sidewall of the tire, the carcass ply remains adjacent the mid-thickness of the sidewall.

4. A pneumatic tire according to claim 1 in which the overall sidewall thickness and the thickness of the rubber inside the tire carcass increase from the widest part of the tire towards the tire shoulder so that throughout the upper sidewall of the tire, the carcass ply remains adjacent the mid-thickness of the sidewall.

5. A pneumatic tire which comprises a tread portion having a substantially flat ground-contacting surface, beads and sidewalls, the tread portion being braced by a breaker assembly and having a width, when the tire is in use and inflated, less than the overall tire-section width, said overall tire-section width being a maximum in the mid-sidewall region of the tire but at least 20% wider than the distance between the heels of the beads, the sidewalls each having a thickness at their thinnest part of at least 5% of said overall tire-section width, the tire moreover containing a carcass reinforcement consisting of a single layer ply of substantially radially-extending textile cords, wherein the cords comprise fibers of a heat-resistant aromatic polyamide having a modulus of at least 3100 g/tex.

6. A pneumatic tire according to claim 5, having an aspect ratio in the range 50 – 75%.

7. A pneumatic tire according to claim 5 in which the sidewalls include rubber compounds of resilience greater than 85% measured by the Dunlop Pendulum Test at 50°C.

8. A pneumatic tire according to claim 5 in which the beads of the tire comprise rubber compound having a hardness greater than 70 Shore A and a resilience of greater than 60% as measured by the Dunlop Pendulum Test at 50°C.

* * * * *